United States Patent Office 3,312,724
Patented Apr. 4, 1967

3,312,724
PREPARATION OF SYMMETRICAL
1,3-DIGLYCERIDES
James Harwood, Western Springs, Ill., assignor to The Glidden Company, Cleveland, Ohio, a corporation of Ohio
No Drawing. Filed Mar. 4, 1964, Ser. No. 349,497
5 Claims. (Cl. 260—410.7)

This invention relates to the preparation of a synthetic glyceride and particularly relates to a process for producing symmetrical diglycerides of fatty acids.

There has been long continuing research for a fat medium that was compatible with cocoa butter and chocolate liquor. Cocoa butter has the characteristic of being solid at ordinary temperatures but of sharply melting at a point somewhat below body temperature. This accounts for the cooling effect of chocolate due to absorption of heat by the melting chocolate when it is taken into the mouth.

Various synthetically prepared fats having the above mentioned characteristics have been heretofore used for admixture with cocoa powder to produce a synthetic chocolate but unfortunately these synthetic fats were not compatible with cocoa butter, thereby restricting their use with chocolate liquor and other cocoa butter containing materials. Recently Bauer et al., U.S. Patent 2,626,952, and Dutton et al., U.S. Patent 3,012,890, described procedures for the preparation of a synthetic fat which has a limited compatibility with cocoa butter. These procedures involve first preferentially crystallizing a saturated fatty acid 1,3-diglyceride from an interesterification mixture of saturated fatty acid triglyceride, triacetin and excess glycerine, and then esterifying the separated diglyceride with oleyl chloride.

These procedures, however, are not commercially practical because of the long period of time involved in the crystallization of the 1,3-diglyceride.

Accordingly, it is an object of the invention to provide an improved process for making symmetrical di-saturated fatty acid diglycerides.

The letter S will be used herein to indicate saturated fatty acid radicals such as stearoyl and palmitoyl.

According to my invention the 1,3-diglycerides are prepared by subjecting a saturated fatty acid diglyceride mixture to fractional crystallization at substantially constant temperature from a solvent in which all of the components of the reacting mixture are soluble, including all the glycerides as well as the glycerine, under rearrangement conditions. Preferably the solvent is removed at a rate which is determined by the rate at which the equilibrium shifts, and the precipitating glyceride is removed from solution. The rate at which the equilibrium is established will depend upon the particular temperature used.

The mechanism whereby 1,3-diglycerides are produced by my process involves the following equilibria:

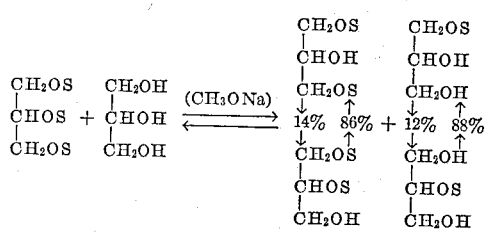

The ratios of the mono- and diglyceride components of the above-represented mixture will depend upon the over-all ratio of glyceryl to fatty-acid radicals which is present. Thus the equilibrium mixture produced from two moles of tristearin and one mole of glycerol will contain a predominance of distearin. The diglycerides present in the equilibrium mixture, as well as the monoglycerides will exist in the ratio of positional isomers shown.

Melting points of the pure glycerides derived from stearic acid are as follows:

|  | ° C. |
|---|---|
| Tristearin | 73.4 |
| 1,3-distearin | 79.8 |
| 1,2-distearin | 71.6 |
| 1-monostearin | 81.5 |
| 2-monostearin | 73.2 |

In accordance with the present invention a solution of the equilibrating mixture, including the catalyst, is provided and the symmetrical diglycerides precipitated at a substantially constant temperature and concentration of glyceryl and fatty acid radicals in the solution. When a proper solvent is used, the first component of such a mixture, in which the diglyceride predominates, to precipitate is the symmetrical diglyceride. By maintaining the temperature and concentration at which the symmetrical diglyceride precipitates substantially constant and at the same time maintaining equilibrating conditions, it is possible to bring about substantially complete precipitation of glycerides as the symmetrical diglyceride.

The solvents used must in addition to being solvents for all of the components of the interesterification mixture be non-reactive with these components, including the catalyst. In batch operation the solvent should be sufficiently volatile to enable it to be removed at the rate desired to maintain the proper concentration. Cyclic ethers, such as tetrahydrofuran, dioxane, and tetrahydropyran, and higher liquid aliphatic ethers such as 1,2-dimethoxyethane are suitable. Such solvents as ordinary ether, alcohols, chloroform, hydrocarbons, and the like are not suitable since one or more of the constituents of the interesterification mixture is insoluble therein or they react with the catalyst.

When the solvent is evaporated, as in a batch process, it is preferable to use vacuum or an inert gas to facilitate the removal.

However, continuous operation is feasible in practicing the present invention in which case removal of solvent during the run is not necessary. In such a case the equilibrium is first established and the reaction mixture cooled to precipitating temperature or excess solvent is removed until precipitation commences at the established precipitating temperature. The glycerine and fatty acid components are then continuously added to the reacting mixture in the proper proportions at the same rate as the glyceride is precipitated. These components can be added as triglyceride and glycerine, or as asymmetrical diglyceride, the proportions being approximately one mole of glycerine to approximately two moles of fatty acid. The materials should of course be anhydrous when such catalysts as sodium methylate or other catalysts destroyed by water are used. Preferably, however, a pre-rearranged mixture of the superglycerinated fat is used.

Some variation of course is possible in the ratio of glycerine to fatty acid. While it is preferable to keep the mole ratio of fatty acid to glycerine at 2 to 1, ratios of from about 1.75 to 1 to 2.25 to 1 lead to precipitates having high percentages of the symmetrical diglycerides.

In the case of batch operation, the batch is finished when all of the glyceride has precipitated and the solvent has been removed. In a continuous operation the precipitated glyceride can be removed in any suitable manner such as by settling and periodical withdrawal of the crystals from the precipitation vessel. Alternatively the mildly agitated slurry of crystals and equilibrating solution can be pumped through a filter or the crystals removed therefrom by a rotating suction filter.

For high purity, symmetrical diglycerides the precipitated material can be recrystallized from a solvent such as petroleum ether or other suitable solvent.

The following examples are illustrative of the invention:

Example 1

(a) A 3-liter 3-neck flask was fitted with a large mechanical stirrer, a Dry-Ice condenser, a thermometer, an $N_2$ inlet, and a heating mantle. A temperature regulator was used to maintain a constant temperature.

The flask was charged with 1 kg. of tristearin, soybean oil flakes, 52 g. of anhydrous glycerol, and 5 g. of sodium methoxide. The temperature was raised to 105° C. and the stirred mixture was maintained at this temperature for 2–3 hours. An atmosphere of dry $N_2$ was maintained throughout the process.

After equilibration of the glyceride mixture as described above, the temperature was allowed to drop to about 80° C. and 1500 ml. of anhydrous tetrahydrofuran was added. The temperature was maintained at 50° C. Gradual removal of solvent was controlled by the rate of the $N_2$ stream; precipitation of product took place as the amount of solvent was reduced. A total reaction time of about 20 hours was employed, and a total of 1340 ml. of solvent was collected. Some solvent was probably lost during overnight periods.

After cooling the reaction mixture, 11 ml. of acetic acid and sufficient petroleum ether were added to make thorough mixing possible. Analysis of the crude product showed the following composition:

| | Percent |
|---|---|
| Triglyceride | 13.3 |
| Diglyceride | 78.8 |
| Monoglyceride | 5.2 |

One crystallization from a mixture of isopropyl alcohol and petroleum ether yielded 658 g. of a product which by thin-layer chromatography was mainly 1,3-distearin.

Replacement of the tetrahydrofuran by dioxane, tetrahydropyran or 1,2-dimethoxyethoxyethane leads to substantially the same results.

(b) When the precipitation was carried out at 55° C. for 6 hours the precipitate contained 62% diglyceride which could be recovered in a high degree of purity on being once recrystallized.

Example 2

The reaction vessel was a 3-liter resin reaction flask heated by means of a heating mantle; it was fitted with a stainless steel stirrer, which was capable of efficient mixing at slow speeds. A Cartesian manostat was used to regulate the pressure. It was used in conjunction with a surge tank and manometer. An aspirator was the vacuum source.

The reaction flask was charged with 1 kg. of tristearin, completely hydrogenated soybean oil, and 52 g. of anhydrous glycerol. This mixture was heated with stirring at 105–110° C. for two hours under a slow stream of dry nitrogen to remove traces of moisture which will inactivate the catalyst. Sodium methoxide, 5 g., was introduced into the vigorously stirred mixture and heating was continued for an additional two hours.

The temperature of the equilibrated glyceride mixture was allowed to drop to about 80° C., then 1 liter of anhydrous tetrahydrofuran was added. After adjustment of the temperature to 55° C., the pressure in the system was reduced until refluxing of solvent occurred. Solvent was withdrawn at a rate of about 150 ml. per hour. The total reaction time was about 7 hours; 920 ml. of solvent was recovered. The temperature was maintained at 55±1° C. by gradual reduction in pressure. Finally the full aspirator vacuum (10–20 mm. Hg) was applied.

After cooling overnight, a sample of the product was ground in petroleum ether containing a drop of acetic acid to neutralize the catalyst. It was analyzed by column chromatography and found to contain triglyceride, 5.25%; diglyceride, 90.70%; and monoglyceride, 2.55%. A second preparation was carried out exactly as described above. Analysis of product showed it contained 3.70% triglyceride, 91.2% diglyceride and 2.80% monoglyceride. Analysis of the diglyceride fraction of this second preparation showed it to contain 3.6% 1,2-distearin, balance 1,3-distearin. This corresponds to 87.6% 1,3-distearin in the crude product.

Example 3

The triglyceride used in this preparation contained 46 mole percent of stearic acid and 54 mole percent of palmitic acid. One kg. of the triglyceride was used, with 54 g. anhydrous glycerol, 5 g. sodium methoxide and 1 liter of tetrahydrofuran. The procedure was the same as that described in Example 2.

Thin-layer chromatography of the product showed that it was principally 1,3-diglyceride with only traces of mono- and triglycerides and 1,2-diglycerides.

A sample of the product was acetylated, then analyzed by gas-liquid chromatography, and showed that the product contained 20.2 mole percent distearin, 51.8 mole percent palmitostearin, and 28.0 mole percent dipalmitin.

It will be appreciated that many modifications can be made in the foregoing procedures without departing from the invention. Thus mixtures of fully hydrogenated oils containing different proportions of stearic and palmitic acid residues can be employed. Also, pure saturated fatty acid glycerides or mixtures thereof can be used.

When using superglycerinated natural fats for the preparation of the diglyceride the presence of small amounts of lower molecular weight saturated fatty acids are not harmful. The symmetrical diglycerides of such lower fatty acids have higher melting points than the asymmetrical diglycerides and while these lower molecular weight diglycerides may not precipitate until the end of the precipitation they will, when precipitated, be of the symmetrical type in preference to the isomeric asymmetrical diglyceride.

Since the symmetrical diglycerides have higher melting points than the corresponding isomeric asymmetrical diglycerides, the use of the high boiling ether solvents, in accordance with the present invention, provides an improved procedure for the production of these saturated diglycerides regardless of the particular fatty acid.

Also, while sodium methoxide is the preferred low temperature interesterification catalyst the art recognizes that there are many other suitable low temperature interesterification catalysts; such for example as are disclosed by Eckey, U.S. Patents 2,442,531, columns 16 and 17, and 2,442,534, columns 10 and 11.

It can thus be seen that the present invention provides a more rapid and efficient method for producing symmetrical saturated diglycerides of fatty acids than heretofore available.

Having thus described my invention, I claim:

1. The process for producing 1,3-diesters of glycerol and saturated fatty acids obtained from natural fats which comprises:

forming a single liquid phase reaction mixture comprising glycerol-providing material and corresponding saturated fatty acid-providing material dissolved in a solvent selected from the group consisting of tetrahydrofuran, tetrahydropyran, dioxane, and 1,2-dimethoxy ethane and a low temperature interesterification catalyst; the ratio of equivalent glycerol to equivalent saturated fatty acid present being from about 1:1.75 and about 1:2.25, and being provided from glycerol and fatty acid-providing material selected from the group consisting of saturated fatty acid, saturated triglyceride fat, asymmetric saturated diglyceride, superglycerinated saturated fat and mixtures of same;

cooling said reaction mixture to a temperature below the melting point of the 1,3-diglyceride but not lower than about 50° C. until a precipitate comprising 1,3-diglyceride is formed and recovering said precipitated 1,3-diglyceride from said reaction mixture.

2. The process of claim 1 wherein the saturated fatty acid of the fatty acid-providing material is selected from the group consisting of palmitic and stearic acids, glyceryl esters of said acids and mixtures thereof.

3. The process of claim 1 wherein the solvent is tetrahydrofuran.

4. The process of claim 1 wherein at least a portion of said solvent is removed during crystallization of said diglyceride.

5. The process of claim 1 wherein said glycerol-providing material and corresponding saturated fatty acid-providing material are continuously dissolved in said solvent during continuous precipitation and recovery of said diglyceride.

References Cited by the Examiner

UNITED STATES PATENTS 2,732,387  1/1956  Brokow et al. _____ 260—410.7
3,232,971  2/1966  Stein et al. _____ 260—410.7

FOREIGN PATENTS 731,388  6/1955  Great Britain.

ALEX MAZEL, *Primary Examiner.*

HENRY R. JILES, JOSEPH P. BRUST, *Examiners.*